United States Patent
Yoo

(10) Patent No.: US 9,718,381 B2
(45) Date of Patent: Aug. 1, 2017

(54) POWER HEADREST APPARATUS

(71) Applicant: HYUNDAE ENTERPRISE CO., LTD, Gyeonggi-do (KR)

(72) Inventor: Hong Chun Yoo, Seoul (KR)

(73) Assignee: HYUNDAE ENTERPRISE CO., LTD, Gyeonggi-Do (KR)

( * ) Notice: Subject to any disclaimer, the term of this patent is extended or adjusted under 35 U.S.C. 154(b) by 93 days.

(21) Appl. No.: 14/854,089

(22) Filed: Sep. 15, 2015

(65) Prior Publication Data

US 2016/0250953 A1   Sep. 1, 2016

(30) Foreign Application Priority Data

Feb. 27, 2015 (KR) .................. 10-2015-0028557

(51) Int. Cl.
  *B60N 2/48* (2006.01)

(52) U.S. Cl.
  CPC ......... *B60N 2/4829* (2013.01); *B60N 2/4805* (2013.01); *B60N 2/4808* (2013.01); *B60N 2/4852* (2013.01); *B60N 2/4861* (2013.01)

(58) Field of Classification Search
  CPC .. B60N 2/4805; B60N 2/4808; B60N 2/4829; B60N 2/482; B60N 2/4852; B60N 2/4861; B60N 2/48
  See application file for complete search history.

(56) References Cited

U.S. PATENT DOCUMENTS

| 4,762,367 | A  | * | 8/1988  | Denton ................ | B60N 2/4864 297/284.8 |
| 5,020,855 | A  | * | 6/1991  | Lindberg ............. | B60N 2/4808 297/284.1 |
| 7,543,888 | B2 | * | 6/2009  | Kuno ................... | B60N 2/0232 297/353 |
| 7,866,754 | B2 | * | 1/2011  | Furukawa ............. | B60N 2/206 297/391 |
| 8,070,222 | B2 | * | 12/2011 | Yamada ............... | B60N 2/4885 297/216.12 |
| 8,272,696 | B2 | * | 9/2012  | Hong ................... | B60N 2/4829 297/391 |
| 8,851,574 | B2 | * | 10/2014 | Yetukuri .............. | B60N 2/4844 297/408 |
| 8,899,685 | B2 | * | 12/2014 | Haeske ................ | B60N 2/4823 297/404 |
| 9,446,695 | B2 | * | 9/2016  | Ishihara ............... | B60N 2/4817 |

(Continued)

FOREIGN PATENT DOCUMENTS

| KR | 10-2010-0030430 | 3/2010 |
| KR | 10-2012-0136555 | 12/2012 |

OTHER PUBLICATIONS

Notice of Allowance from corresponding Korean Patent Application 10-2015-0028557 dated Dec. 7, 2015 (3 pages).

*Primary Examiner* — Phi A
(74) *Attorney, Agent, or Firm* — Anderson Gorecki LLP

(57) ABSTRACT

Disclosed herein is a power headrest apparatus capable of automatically adjusting vertical and forward-backward movement of a headrest using motors, and of sufficiently securing an amount of forward-backward movement of the headrest using a pair of link members, which are arranged to intersect with each other in an X form, while a width of the headrest in forward and backward directions thereof is maintained below a certain level.

7 Claims, 8 Drawing Sheets

(56) References Cited

U.S. PATENT DOCUMENTS

| | | | |
|---|---|---|---|
| 2006/0175881 A1* | 8/2006 | Akaike | B60N 2/482 297/216.12 |
| 2006/0226688 A1* | 10/2006 | Terada | B60N 2/4885 297/391 |
| 2006/0279114 A1* | 12/2006 | Toda | B60N 2/4885 297/216.12 |
| 2012/0222511 A1* | 9/2012 | Jeong | B60N 2/4829 74/22 A |

* cited by examiner

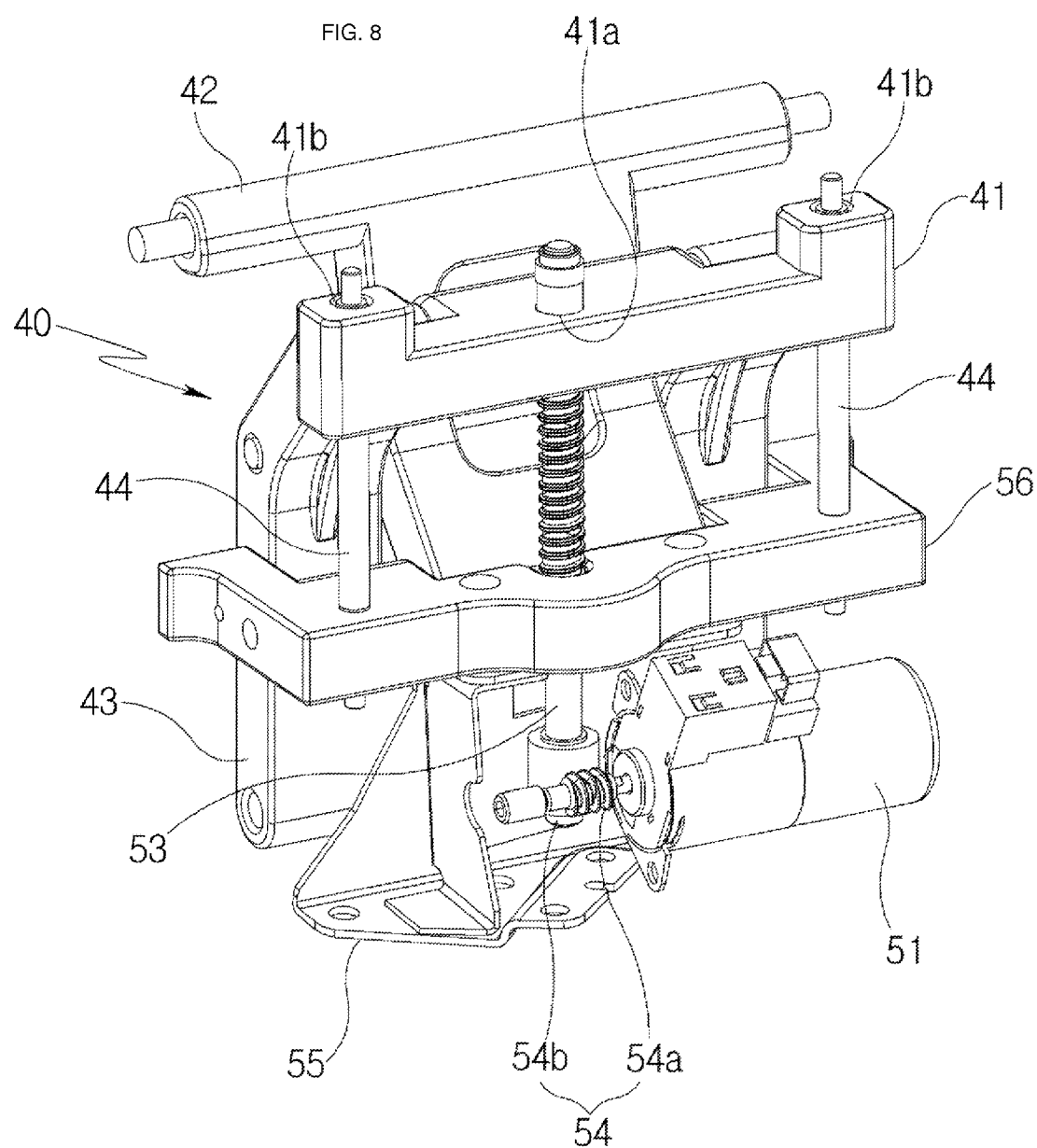

POWER HEADREST APPARATUS

CROSS-REFERENCE(S) TO RELATED APPLICATIONS

This application claims priority to Korean Patent Application No. 10-2015-0028557, filed on Feb. 27, 2015, the disclosure of which is incorporated herein by reference in its entirety.

BACKGROUND OF THE INVENTION

Field of the Invention

Exemplary embodiments of the present invention relate to a power headrest apparatus, and more particularly, to a power headrest apparatus capable of automatically adjusting vertical and forward-backward positions of a headrest, which is provided at the upper end of a vehicle seat back, using respective motors.

Description of the Related Art

In general, a driver seat, an occupant seat, and seats as other occupant seats, which are installed in front of and behind a vehicle interior, have various comfort devices for convenience of occupants.

The comfort devices have a sliding function of adjusting a seat cushion by the forward and backward pushing/pulling of the seat cushion, a reclining function of adjusting the inclination of a seat back corresponding to the back of the seat, according to the body types of occupants, and a seat height adjustment function of adjusting the height of the seat cushion so as to be suitable for the body sizes of occupants.

In addition, a headrest apparatus, which includes a headrest for supporting the head of the occupant at the upper end of the seat back, is typically applied to the vehicle seat.

The headrest apparatus has a function of adjusting the vertical and forward-backward positions of the headrest so as to be suitable for the body type of the occupant.

The function of adjusting the vertical and forward-backward positions of the headrest may be performed by a manual method using the operation force of a user or by a motor-driven method using a motor. A power headrest apparatus has a structure that adopts the motor-driven method and is well known in the related technical field.

In connection with the motor-driven type power headrest apparatus, Japanese Patent Laid-open Publication No. H05-0056827 discloses a power headrest apparatus in which a headrest is tilted in forward and backward directions by the operation of an actuation mechanism along with the driving of a motor.

However, the power headrest apparatus disclosed in the above patent document adjusts the forward-backward position of the headrest through the structure in which the headrest is tilted in forward and backward directions instead of in a horizontal direction. For this reason, it is difficult to adjust the forward-backward position of the headrest so as to be suitable for the body types and sensitivities of occupants.

In addition, when a large load is suddenly applied to the headrest as in the rear-end collision of a vehicle, a considerable torque is applied to the actuation mechanism for tilting in the state in which the headrest is tilted. Accordingly, there is a high possibility that the actuation mechanism is damaged, and there is a high possibility that the head and neck of an occupant are secondarily damaged when the actuation mechanism is damaged.

Meanwhile, Korean Patent Laid-open Publication No. 2006-0134430 discloses a power headrest apparatus which adjusts the forward-backward position of a headrest by moving a spiral rod, connected to the headrest, in forward and backward directions by the driving of a motor.

However, the power headrest apparatus disclosed in the patent document has the structure in which an amount of forward-backward movement of the headrest depends on the length of the spiral rod. For this reason, it is impossible to secure the amount of forward-backward movement of the headrest enough to satisfy sensitivities of occupants, and thus it is necessary to increase the width of the headrest in the forward and backward directions thereof in order to secure a sufficient amount of movement.

[Patent Document 0001] Japanese Patent Laid-open Publication No. H05-0056827

[Patent Document 0002] Korean Patent Laid-open Publication No. 2006-0134430

SUMMARY OF THE INVENTION

An object of the present invention is to provide a power headrest apparatus capable of satisfying sensitivities of occupants by automatically moving a headrest in forward and backward directions thereof using a motor and by horizontally moving the headrest in the forward and backward directions thereof using a pair of link members which are arranged to intersect with each other in an X form.

Another object of the present invention is to provide a power headrest apparatus capable of sufficiently securing an amount of forward-backward movement of a headrest using a pair of link members, which are arranged to intersect with each other in an X form, while a width of the headrest in forward and backward directions thereof is maintained below a certain level.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a power headrest apparatus includes a supporting rod supported by a seat back frame of a vehicle seat so as to be vertically movable, a headrest part including a stationary part, fixedly connected to an upper end portion of the supporting rod, and a movable part, connected to the upper end portion of the supporting rod so as to be movable in forward and backward direction of the seat, a link part including first and second link members, front end portions of which are connected to the movable part while rear end portions thereof are connected to the supporting rod, a first driving part for vertically moving the supporting rod by electric power supplied from an outside, and a second driving part for moving the movable part relative to the stationary part by electric power supplied from the outside, wherein the first and second link members are arranged to intersect with each other in an X form, and are interconnected to be pivotable about a pivot shaft, and the second driving part vertically moves one of the rear end portions of the first and second link members.

The first driving part may include a first motor fixed to the seat back frame, a first lead screw extending vertically and rotatably driven by the first motor, and a sliding base connected to a lower end portion of the supporting rod and having a first screw hole screwed to the first lead screw, and when the first motor is driven, the sliding base may be vertically moved by action of the first lead screw.

The first driving part may further include a fixing bracket for fixing the first motor to the seat back frame, and at least one first guide rod extending vertically, an upper end portion of the first guide rod being connected to the fixing bracket, a lower end portion thereof being connected to the sliding base, and the sliding base may have at least one guide hole such that the first guide rod extends through the guide hole.

The first driving part may further include a first deceleration part provided between the first motor and the first lead screw.

The second driving part may include a lower end support member fixed to the upper end portion of the supporting rod and pivotably connected with the rear end portion of the first link member, a second motor fixed to a lower side surface of the lower end support member, a second lead screw extending vertically through the lower end support member and rotatably driven by the second motor, and a slider pivotably connected with the rear end portion of the second link member and having a second screw hole screwed to the second lead screw, and when the second motor is driven, the slider may be vertically moved by action of the second lead screw.

The second driving part may further include at least one second guide rod extending vertically, a lower end portion of the second guide rod being fixed to the lower end support member, an upper end portion thereof extending through the slider, and the second guide rod may guide the vertical movement of the slider.

The second driving part may further include a holder for fixing the second motor to the lower end support member.

The second driving part may further include a second deceleration part, which is fixed to the holder and is provided between the second motor and the second lead screw.

The second deceleration part may include a worm connected to an output shaft of the second motor, and a worm gear provided at a lower end portion of the second lead screw.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 8 is a perspective view for explaining a deceleration part of the second driving part illustrated in FIG. 7.

DESCRIPTION OF SPECIFIC EMBODIMENTS

Figure 1:
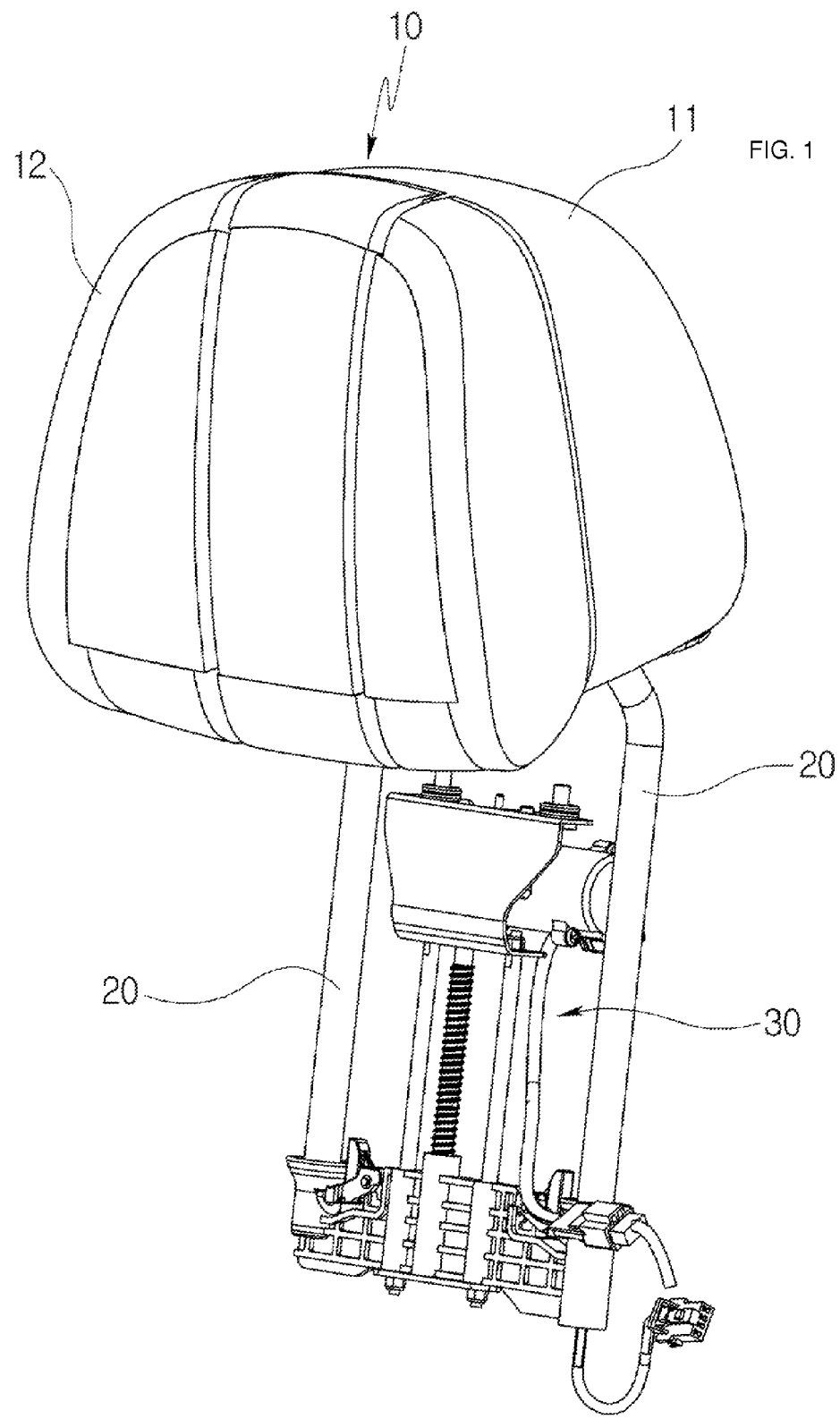
FIGS. 1 and 2 are perspective views illustrating a power headrest apparatus according to an embodiment of the present invention.

A power headrest apparatus according to exemplary embodiments of the present invention will be described below in detail with reference to the accompanying drawings.

Since various modifications may be performed on the exemplary embodiments of the present invention and the embodiments of the present invention can be implemented in a wide range of varied forms, specific exemplary embodiments of the present invention will be described herein in detail with reference to the accompanying drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the accompanying drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition, the following embodiments are provided so that this disclosure will be thorough and complete, and will fully convey the scope of the present invention to those skilled in the art. In the drawings, the shape, size, or the like of each component may be exaggerated for convenience of description and clarity.

Figure 2:
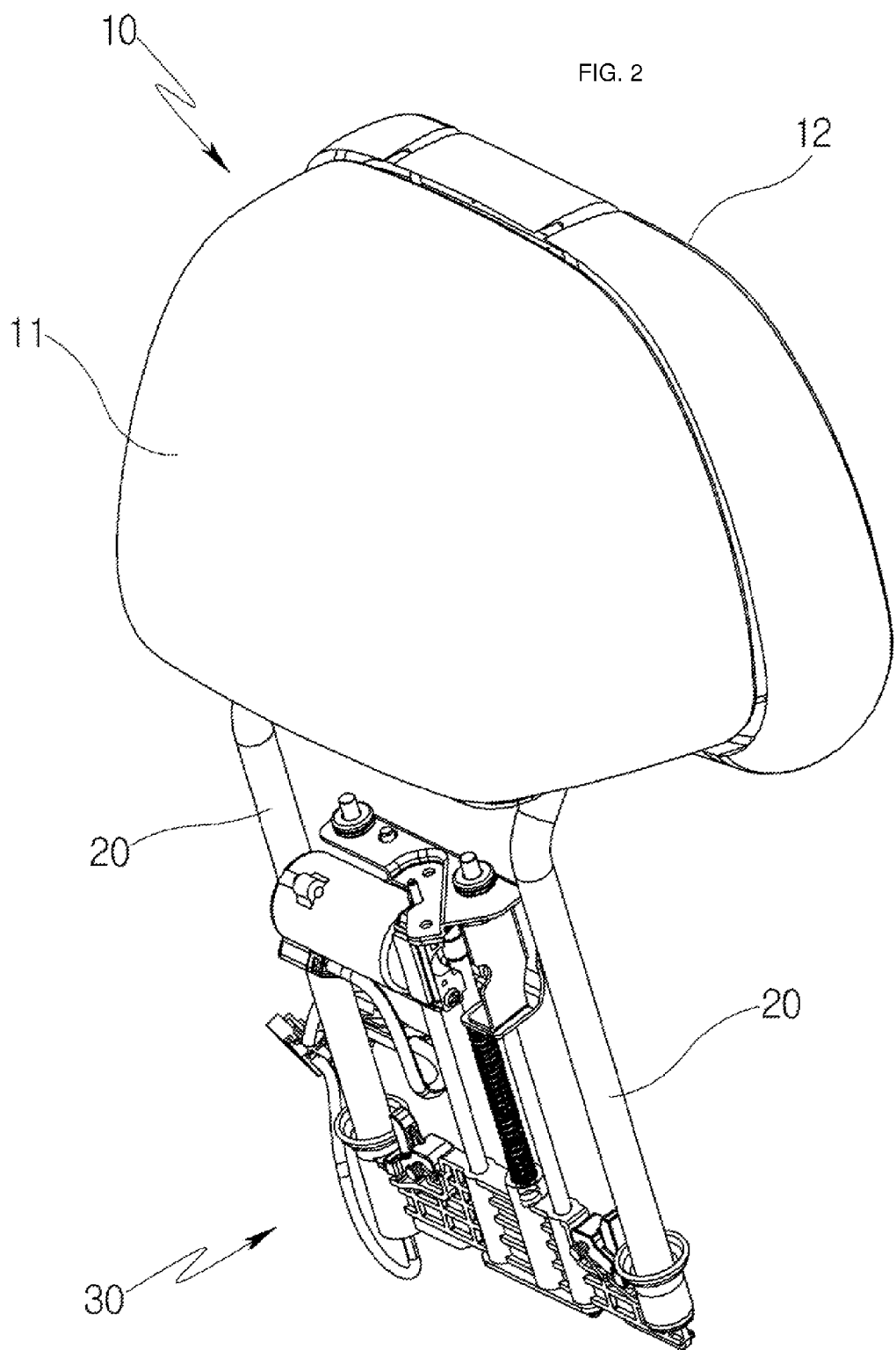

FIGS. 1 and 2 are perspective views illustrating a power headrest apparatus 100 according to an embodiment of the present invention.

As illustrated in FIGS. 1 and 2, the power headrest apparatus 100 according to the embodiment of the present invention includes a means for adjusting the vertical and forward-backward positions of a headrest part 10 in a motor-driven manner.

That is, the power headrest apparatus 100 of the present invention includes a supporting rod 20 which is supported by a seat back frame of a vehicle so as to be vertically movable, a headrest part 10 including a stationary part 11, which is fixedly connected to the upper end portion of the supporting rod 20, and a movable part 12, which is connected to the upper end portion of the supporting rod 20 so as to be movable in the forward and backward direction of a seat, a first driving part 30 which vertically moves the supporting rod 20, and a second driving part 50 which moves the movable part 12 relative to the stationary part 11.

The supporting rod 20 supports the headrest part 10, and the headrest part 10 is securely attached to the upper end portion of the supporting rod 20 which is exposed to the outside of a seat back. The second driving part 50 is connected to the lower end portion of the supporting rod 20 which extends inward of the seat back, and is supported to be vertically movable relative to the seat back frame (not shown).

The first driving part 30 is connected to the lower end portion of the supporting rod 20 to vertically move the supporting rod 20 in a motor-driven manner. The first driving part 30 includes a first motor 31 which is operated by electric power supplied from the outside, as will be described later.

The second driving part 50 is connected to the upper end portion of the supporting rod 20 to move the movable part 12 of the headrest part 10 in the forward and backward directions in a motor-driven manner. The second driving part 50 includes a second motor 51 which is operated by electric power supplied from the outside, as will be described later.

The headrest part 10 is a part for directly supporting the head of an occupant. The headrest part 10 is divided into the stationary part 11, which is fixedly connected to the upper end portion of the supporting rod 20, and the movable part 12 which is provided in front of the stationary part 11 and is connected to the upper end portion of the supporting rod 20 so as to be movable in the forward and backward directions.

That is, the headrest part 10 of the power headrest apparatus 100 according to the present invention is divided into the stationary part 11 and the movable part 12, such that the forward-backward position of the headrest part 10 may be adjusted to be suitable for the body type and sensitivity of the occupant.

Meanwhile, the power headrest apparatus 100 of the present invention includes a link part 40 which is installed inside the headrest part 10 and includes a pair of first and second link members 42 and 43, in order to move the movable part 12 in the forward and backward directions.

The detailed structures of the link part 40, the first driving part 30, and the second driving part 50 will be described below with reference to FIG. 3 and the like.

As described above, the power headrest apparatus 100 of the present invention includes the first driving part 30 for vertically moving the supporting rod 20, in order to vertically move the headrest part 10.

Figure 3:
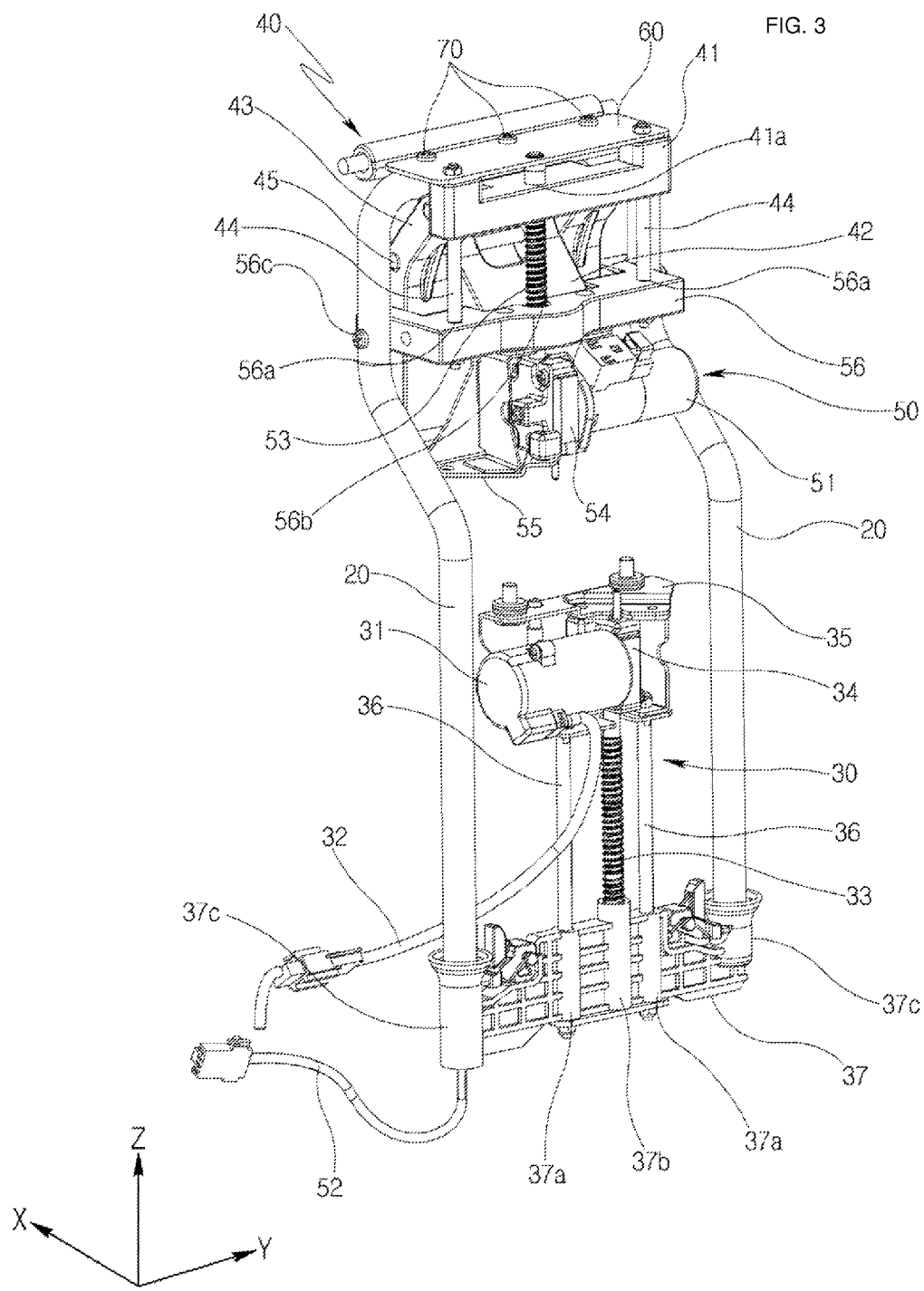
FIGS. 3 and 4 are perspective views for explaining a detailed structure of the power headrest apparatus according to the embodiment of the present invention.
Figure 4:
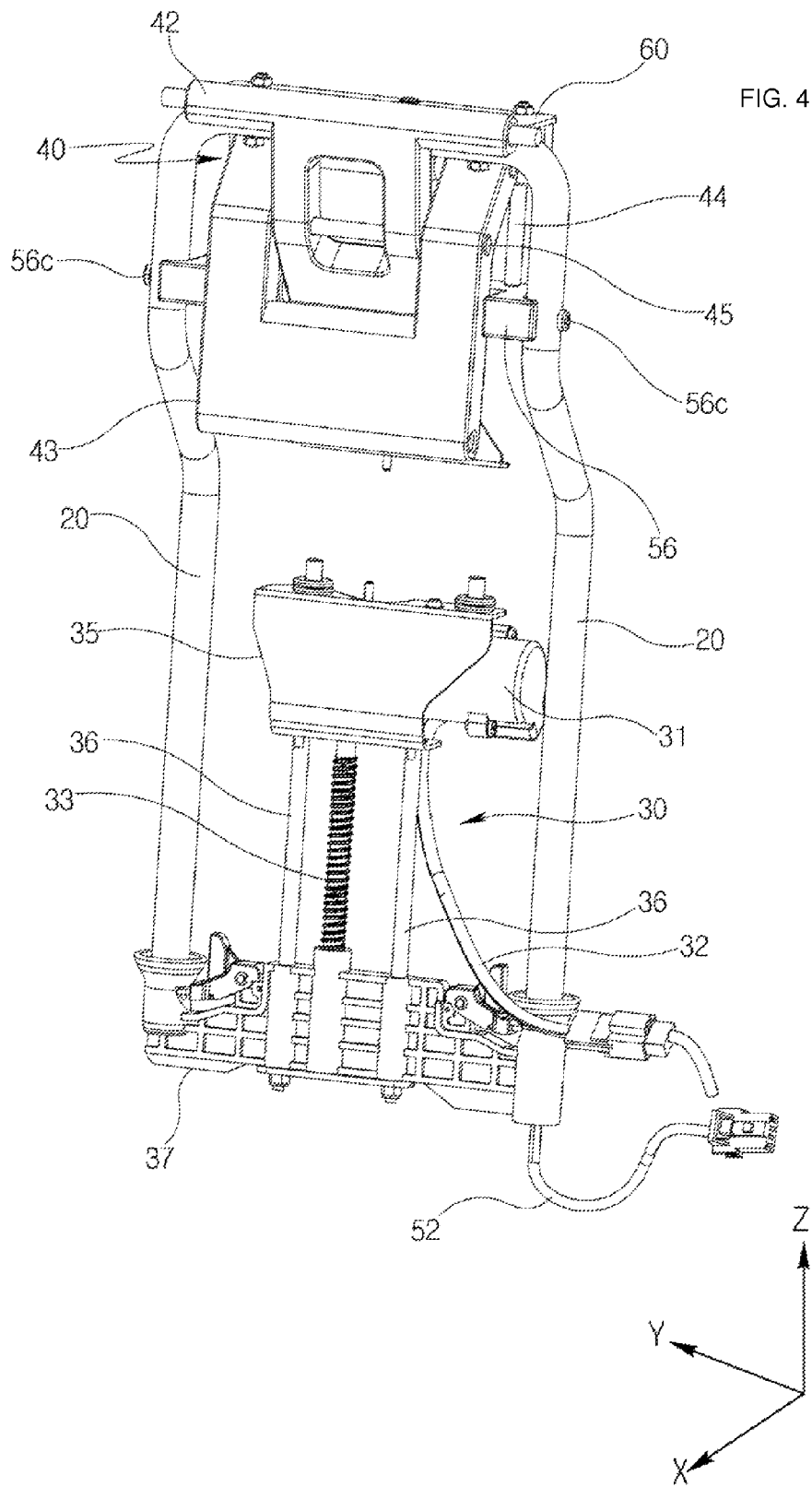

In more detail, the first driving part 30 includes a first motor 31 which is fixed to the seat back frame, a first lead screw 33 which extends vertically and is rotatably driven by the first motor 31, a sliding base 37 which is connected to the lower end portion of the supporting rod 20 and has a first screw hole 37b screwed to the first lead screw 33, and a first deceleration part 34 which is provided between the first motor 31 and the first lead screw 33, as illustrated in FIGS. 3 and 4.

The first motor 31 is fixed to the seat back frame (not shown) by a fixing bracket 35, is operated by electric power supplied from the outside through a first cable 32, and generates rotational force transferred to the first lead screw 33.

The first motor 31 may be applied to the present invention without limitation, as long as it has a structure that generates rotational force by electric power supplied from the outside. However, the first motor 31 is preferably an electric motor which may have a small size and generate high power in consideration of space utilization.

The first lead screw 33 extends vertically (in the Z-direction), and is rotated by the rotational force transferred from the first motor 31. The upper end portion of the first lead screw 33 is formed with a driven gear (worm gear, not shown) which forms the first deceleration part 34, and the outer peripheral surface of the first lead screw 33 is formed with a screw portion which is engaged with a thread formed on the inner peripheral surface of the first screw hole 37b of the sliding base 37.

The first lead screw 33 is supported by the fixing bracket 35 in the state in which the first lead screw 33 is rotatable, but is restricted from moving vertically (in the Z-direction).

Through this screwing between the first lead screw 33 and the first screw hole 37b of the sliding base 37, the rotation of the first lead screw 33 is converted into the vertical movement of the sliding base 37.

The sliding base 37 converts the rotation of the first lead screw 33 into vertical (Z-direction) linear movement, and thus the sliding base 37 serves to vertically move the supporting rod 20.

As described above, the sliding base 37 has the first screw hole 37b, which is screwed to the first lead screw 33, and both side end portions of the sliding base 37 are formed with coupling portions 37c through which the support rod 20 is inserted and fixed. When the sliding base 37 is vertically moved by the first lead screw 33, the supporting rod 20 connected to the sliding base 37 through the coupling portions 37c is moved vertically (in the Z-direction) so that the headrest part is vertically moved.

Meanwhile, the first driving part 30 includes a pair of first guide rods 36 which extend vertically for guiding the vertical (Z-direction) movement of the sliding base 37.

The upper end portions of the pair of first guide rods 36 are fixed to the fixing bracket 35, and the lower end portions thereof extend through a pair of respective guide holes 37a formed in the sliding base 37.

Accordingly, the vertical (Z-direction) movement of the sliding base 37 may be effectively guided by the first guide rods 36 and the guide holes 37a.

The first deceleration part 34 is provided between the first motor 31 and the first lead screw 33, and reduces the driving force of the first motor 31 to transfer the reduced driving force to the first lead screw 33. The first deceleration part 34 may include a worm and a worm gear, similarly to a second deceleration part 54 to be described later.

As described above, the power headrest apparatus 100 of the present invention includes the second driving part 50, and the link part 40 having the pair of first and second link members 42 and 43, which are arranged to intersect with each other in an X form and are interconnected to be pivotable about a pivot shaft 45, in order to move the movable part 12 of the headrest part 10 in the forward and backward directions (in the X-direction). The second driving part 50 and the link part 40 are provided inside the headrest part 10.

Figure 5:
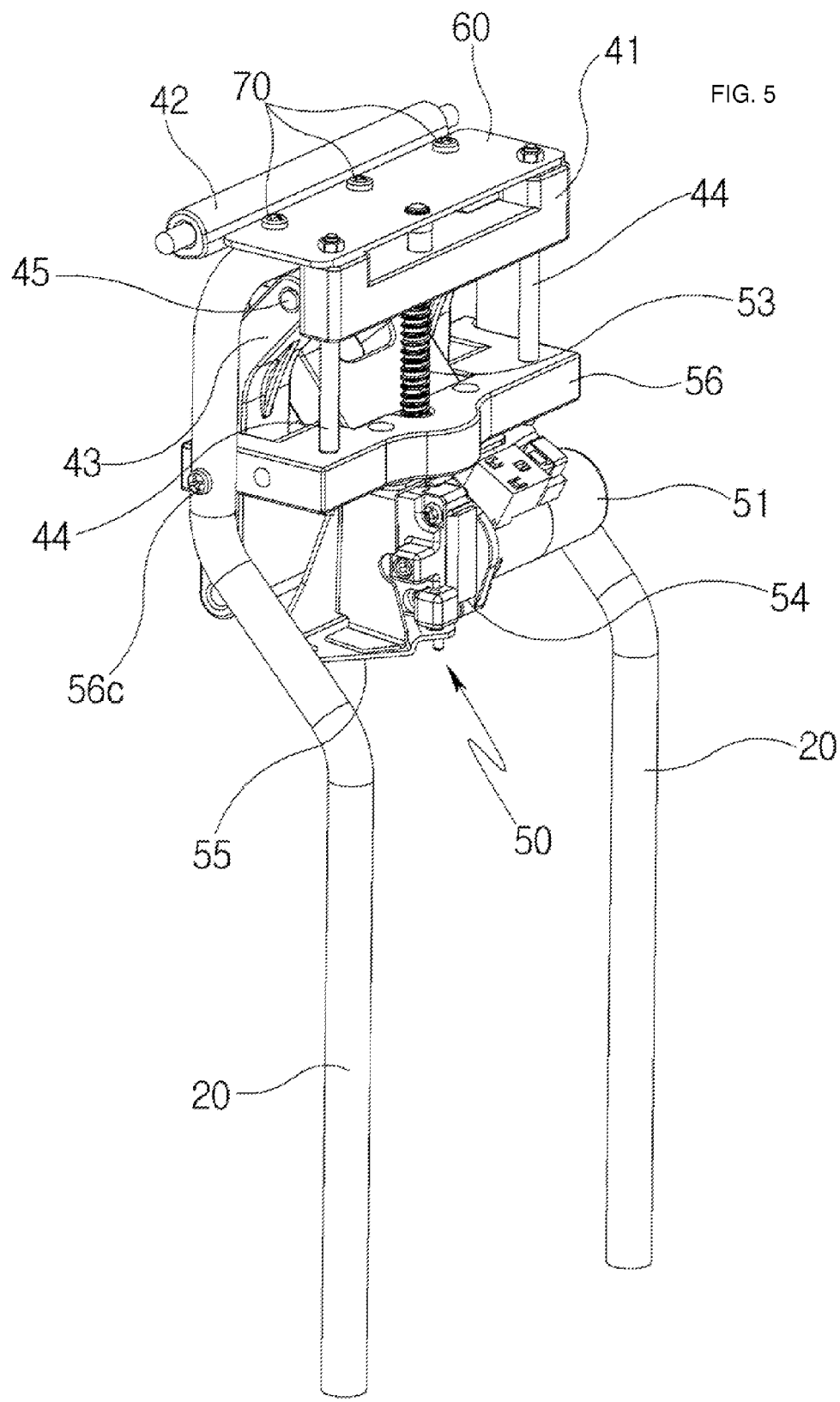
FIG. 5 is a perspective view for explaining structures of a link part and a second driving part of the power headrest apparatus according to the embodiment of the present invention.
Figure 6:
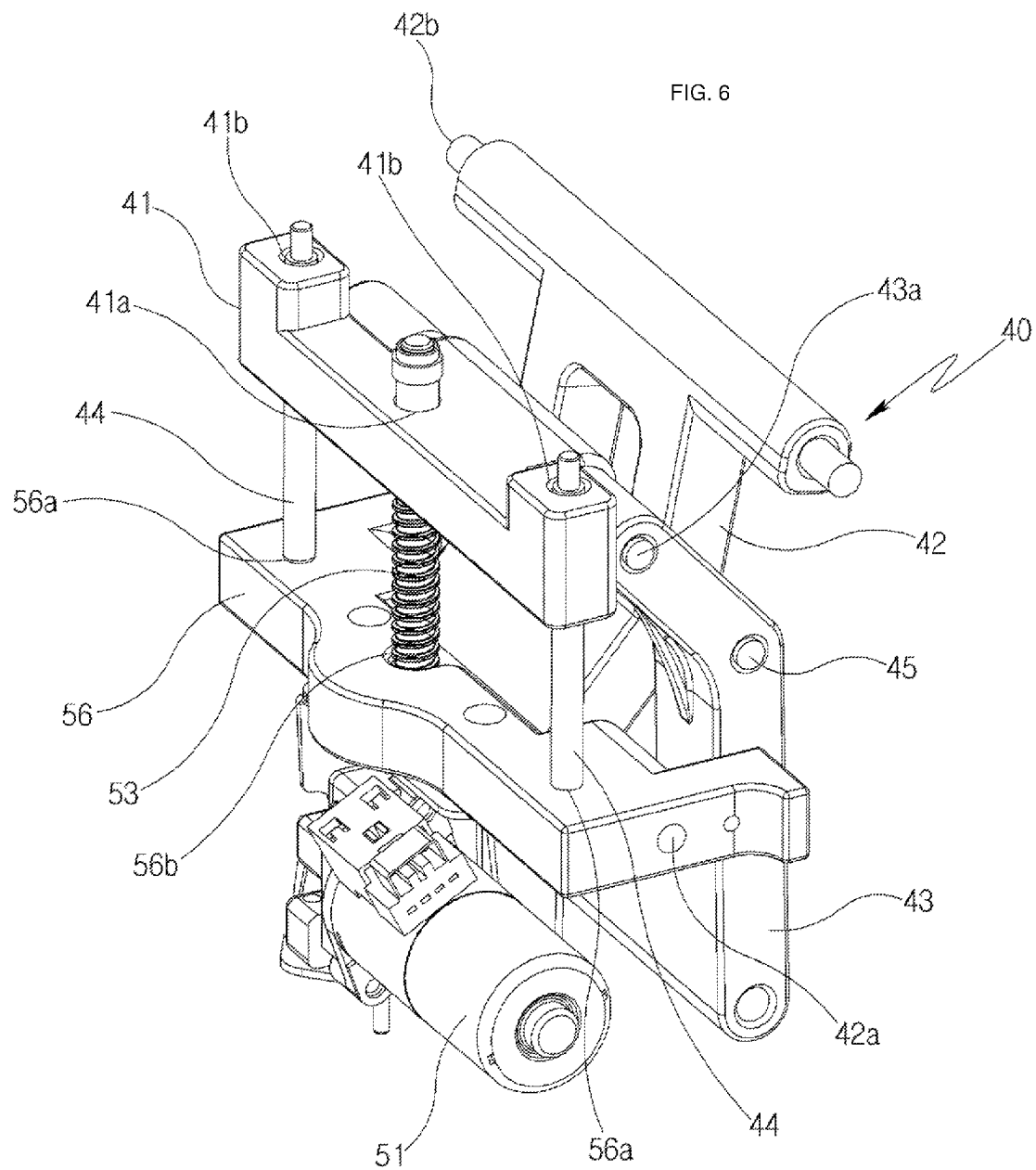
FIGS. 6 and 7 are enlarged views illustrating the link part and the second driving part illustrated in FIG. 5.
Figure 7:
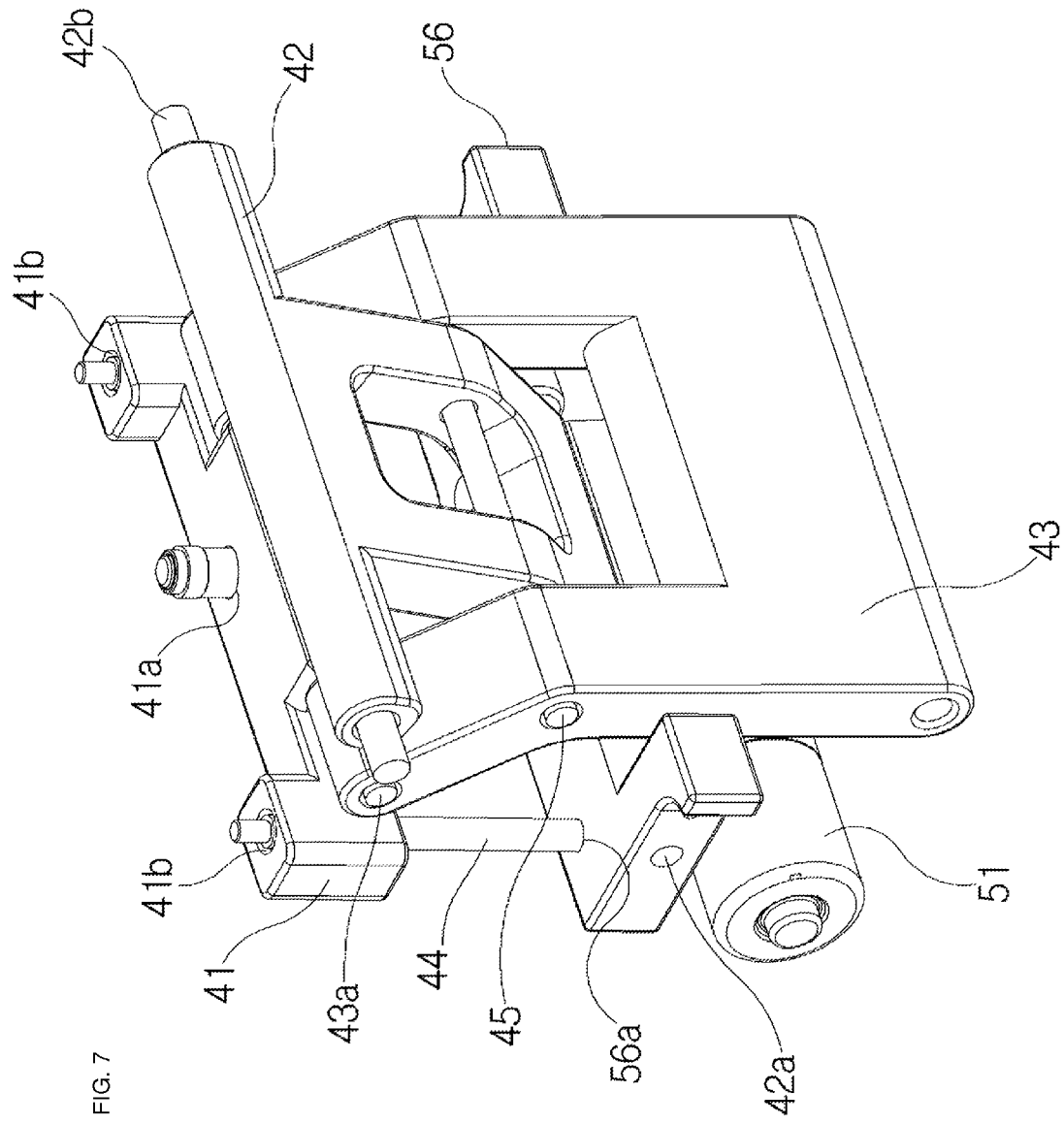

In more detail, the second driving part 50 includes a lower end support member 56, which is fixed to the upper end portion of the supporting rod 20 and is pivotably connected with the rear end portion of the first link member 42, a second motor 51 which is fixed to the lower side surface of the lower end support member 56, a second lead screw 53 which extends vertically through the lower end support member and is rotatably driven by the second motor 51, a slider 41, which is pivotably connected with the rear end portion of the second link member 43 and has a second screw hole 41a screwed to the second lead screw 53, and a second deceleration part 54 which is provided between the second motor 51 and the second lead screw 53, as illustrated in FIGS. 5 to 7.

The lower end support member 56 is securely fixed to the supporting rod 20 by fastening elements such as bolts 56c, and supports the second motor 51, the second lead screw 53, and the second deceleration part 54.

As illustrated in the drawings, the second motor 51, the second lead screw 53, and the second deceleration part 54 are attached to the lower side surface of the lower end support member 56 through a holder 55.

In addition, the rear end portion of the first link member 42 is pivotably connected to the lower end support member 56 through a first shaft 42a to be described later.

The second motor 51 is fixed to the lower end support member 56 through the holder 55, is operated by electric power supplied from the outside through a second cable 52, and generates rotational force transferred to the second lead screw 53.

The second motor 51 may be applied to the present invention without limitation, as long as it has a structure that generates rotational force by electric power supplied from the outside. However, the second motor 51 is preferably an electric motor which may have a small size and generate high power in consideration of space utilization, similarly to the first motor 31.

The second lead screw 53 is rotated by the rotational force transferred from the second motor 51. The lower end portion of the second lead screw 53 is formed with a driven gear (worm gear) 54b (see FIG. 8) which is connected to the second deceleration part 54, and the outer peripheral surface of the second lead screw 53 is formed with a screw portion which is engaged with a thread formed on the inner peripheral surface of the second screw hole 41a of the slider 41.

The second lead screw 53 is supported by the holder 55 in the state in which the second lead screw 53 is rotatable, but is restricted from moving vertically (in the Z-direction). The second lead screw 53 extends upward through a through-hole 56b (see FIG. 3) of the lower end support member 56.

The slider 41 is provided at the upper portion of the lower end support member 56. The slider 41 converts the rotation of the second lead screw 53 into vertical linear movement, and thus serves to vertically move the rear end portion of the second link member 43 when the second motor 51 is driven.

As illustrated in FIGS. 5 to 7, the rear end portion of the second link member 43 is pivotably connected to the slider 41 through a second shaft 43a.

In order to guide the vertical linear movement of the slider 41, the power headrest apparatus 100 includes at least one second guide rod 44, the lower end portion of which protrudes from the upper side surface of the lower end support member 56 to extend upward in the state of being inserted into an insertion hole 56a (see FIG. 3) of the lower end support member 56 while the upper end portion of the second guide rod 44 extends through a sliding hole 41b of the slider 41.

FIGS. 5 to 7 illustrate two second guide rods 44 in the embodiment, but the present invention is not limited thereto.

Meanwhile, the power headrest apparatus 100 may include a fixing plate 60 as illustrated in FIG. 5, in order to prevent the slider 41 from being decoupling from the second guide rod 44.

One side of the fixing plate 60 is securely fixed to the supporting rod 20 using a plurality of fastening members 70, and the second guide rod 44 is coupled through the other side of the fixing plate 60.

The link part 40 serves to convert the vertical movement of the slider 41 into the forward-backward movement of the movable part 12 of the headrest part 10.

In more detail, the link part 40 includes the first and second link members 42 and 43 which are arranged to intersect with each other in the X form and are interconnected to be pivotable about the pivot shaft 45.

That is, the power headrest apparatus of the present invention adjusts the forward-backward position of the movable part 12 of the headrest part 10 using the first and second link members 42 and 43, which are interconnected in a scissor form to be pivotable about the pivot shaft 45, and thus it is possible to maximally secure an amount of forward movement of the headrest while the width of the headrest part 10 in the forward and backward directions thereof is maintained to a certain level.

In detail, the front end portions of the first and second link members 42 and 43 are pivotably connected to the movable part 12 of the headrest part 10 using connection protrusions 42b or the like.

The rear end portion of the first link member 42 is pivotably connected to the lower end support member 56 through the first shaft 42a, and the rear end portion of the second link member 43 is pivotably connected to the slider 41 through the second shaft 43a.

Accordingly, when the second motor 51 is operated, the rotational force of the second motor 51 is transferred to the second lead screw 53 via the second deceleration part. In this case, since the slider 41 is vertically moved when the second lead screw 53 rotates, the rear end portion of the second link member 43, which is pivotably connected to the slider 41, is vertically moved.

Thus, when the rear end portion of the second link member 43 is vertically moved, the first and second link members 42 and 43, which are interconnected in the X form, are folded or unfolded. Through this process, the amount of forward-backward movement of the movable part 12 of the headrest is maintained over a certain level while the width of the headrest in the forward and backward directions thereof is maintained below a certain level.

FIGS. 5 to 7 illustrate a state in which the rear end portion of the first link member 42 is maximally spaced apart from the rear end portion of the second link member 43, i.e. a state in which the movable part 12 of the headrest part 10 is maximally pressed toward the stationary part 11.

When the second motor 51 is rotated by electric power supplied thereto in the above state, the slider 41 is linearly moved downward along the second guide rod 44 by the rotation of the second lead screw 53. Thereby, when the slider 41 is moved downward, the front end portions of the first and second link members 42 and 43 are gradually moved forward.

The movable part 12 of the headrest is moved forward by the action of the first and second link members 42 and 43.

FIG. 8 illustrates the detailed structure of the second deceleration part 55. The second deceleration part 55 includes a worm 54a which is connected to the output shaft of the second motor 51, and a worm gear 54b which is provided at the second lead screw 53.

Accordingly, the structure of the second deceleration part, which is provided between the second motor 51 and the second lead screw 53, may be simplified by means of the simple worm 54a and worm gear 54b.

In addition, the worm 54a is provided at the output shaft of the second motor 51, and the worm gear 54b is provided at the lower end portion of the second lead screw 53. Therefore, when the driving of the second motor 51 is stopped, the rotation of the second lead screw 53 may be prevented from being reversely input to the second motor 51 by the weight of the movable part 12 of the headrest part 10 or the load of the occupant.

That is, since the position of the movable part 12 of the headrest part 10 is fixed by the second deceleration part 54 including the worm 54a and the worm gear 54b, a separate means for fixing the position of the movable part 12 is not required.

The structure of the second deceleration part 54 including the worm 54a and the worm gear 54b may also be identically applied to the first deceleration part 34 of the first driving part 30.

As is apparent from the above description, a power headrest apparatus according to the present invention has an effect of satisfying sensitivities of occupants by automatically moving a headrest in forward and backward directions thereof using a motor and by horizontally moving the headrest in the forward and backward directions thereof using a pair of link members which are arranged to intersect with each other in an X form.

In addition, the power headrest apparatus has an effect of sufficiently securing an amount of forward-backward movement of the headrest using the pair of link members, which are arranged to intersect with each other in the X form, while a width of the headrest in forward and backward directions thereof is maintained below a certain level.

Various embodiments have been described in the best mode for carrying out the invention. It will be understood that the above-mentioned technical configurations of the exemplary embodiments may be executed in order to enable those of ordinary skill in the art to embody and practice the invention in other specific forms without changing the spirit or essential features of the invention.

Although the present invention has been described with respect to the illustrative embodiments, it will be apparent to those skilled in the art that various variations and modifications may be made without departing from the spirit and scope of the invention as defined in the following claims.

What is claimed is:

1. A power headrest apparatus comprising:
   a supporting rod supported by a seat back frame of a vehicle seat so as to be vertically movable;
   a headrest part comprising a stationary part, fixedly connected to an upper end portion of the supporting rod, and a movable part, connected to the upper end portion of the supporting rod so as to be movable in forward and backward direction of the seat;
   a link part comprising first and second link members, front end portions of which are connected to the movable part while rear end portions thereof are connected to the supporting rod;
   a first driving part for vertically moving the supporting rod by electric power supplied from an outside; and
   a second driving part for moving the movable part relative to the stationary part by the electric power supplied from the outside, wherein:
   the first and second link members are arranged to intersect with each other in an X form, and are interconnected to be pivotable about a pivot shaft; and
   the second driving part vertically moves one of the rear end portions of the first and second link members;
   wherein the second driving part comprises:
   a lower end support member fixed to the upper end portion of the supporting rod and pivotably connected with the rear end portion of the first link member;
   a second motor fixed to a lower side surface of the lower end support member;
   a second lead screw extending vertically through the lower end support member and rotatably driven by the second motor; and
   a slider pivotably connected with the rear end portion of the second link member and having a second screw hole screwed to the second lead screw, and
   wherein, when the second motor is driven, the slider is vertically moved by action of the second lead screw;
   wherein the second driving part further comprises at least one second guide rod extending vertically, a lower end portion of the second guide rod being fixed to the lower end support member, an upper end portion thereof extending through the slider; and
   wherein the second guide rod guides the vertical movement of the slider.

2. The power headrest apparatus according to claim 1, wherein the first driving part comprises:
   a first motor fixed to the seat back frame;
   a first lead screw extending vertically and rotatably driven by the first motor; and
   a sliding base connected to a lower end portion of the supporting rod and having a first screw hole screwed to the first lead screw, and
   wherein, when the first motor is driven, the sliding base is vertically moved by action of the first lead screw.

3. The power headrest apparatus according to claim 2, wherein the first driving part further comprises:
   a fixing bracket for fixing the first motor to the seat back frame; and
   at least one first guide rod extending vertically, an upper end portion of the first guide rod being connected to the fixing bracket, a lower end portion thereof being connected to the sliding base, and
   wherein the sliding base has at least one guide hole such that the first guide rod extends through the guide hole.

4. The power headrest apparatus according to claim 2, wherein the first driving part further comprises a first deceleration part provided between the first motor and the first lead screw.

5. The power headrest apparatus according to claim 1, wherein the second driving part further comprises a holder for fixing the second motor to the lower end support member.

6. The power headrest apparatus according to claim 5, wherein the second driving part further comprises a second deceleration part, which is fixed to the holder and is provided between the second motor and the second lead screw.

7. The power headrest apparatus according to claim 6, wherein the second deceleration part comprises a worm connected to an output shaft of the second motor, and a worm gear provided at a lower end portion of the second lead screw.

* * * * *